(12) United States Patent
Nakaho

(10) Patent No.: US 6,997,570 B2
(45) Date of Patent: Feb. 14, 2006

(54) REFLECTING MIRROR

(75) Inventor: Junichi Nakaho, Aichi-ken (JP)

(73) Assignee: Kabushiki Kaisha Tokai-Rika-Denki Seisakusho, Aichi-Ken (JP)

( * ) Notice: Subject to any disclaimer, the term of this patent is extended or adjusted under 35 U.S.C. 154(b) by 113 days.

(21) Appl. No.: 10/815,796

(22) Filed: Apr. 2, 2004

(65) Prior Publication Data

US 2004/0196580 A1   Oct. 7, 2004

(30) Foreign Application Priority Data

Apr. 3, 2003   (JP) .............................. 2003-100273

(51) Int. Cl.
    *G02B 5/08*   (2006.01)
(52) U.S. Cl. ...................................... 359/883; 359/507
(58) Field of Classification Search ................ 359/507, 359/601, 602, 513, 514, 883
    See application file for complete search history.

(56) References Cited

U.S. PATENT DOCUMENTS

| 6,425,670 B1 * | 7/2002 | Komatsu et al. ............ 359/507 |
| 2001/0030808 A1 * | 10/2001 | Komatsu et al. ............ 359/507 |

FOREIGN PATENT DOCUMENTS

| JP | 2756474 | 3/1998 |
| JP | 2924902 | 5/1999 |
| JP | 2000-239047 | 9/2000 |

* cited by examiner

*Primary Examiner*—Euncha P. Cherry
(74) *Attorney, Agent, or Firm*—Nixon Peabody LLP

(57) ABSTRACT

In the reflecting mirror of the present invention, the film thickness of a photocatalytic hydrophilic film mainly made of silicon dioxide is set to about 90 nm, and the mass ratio of photocatalyst particles made of titanium dioxide contained in the photocatalytic hydrophilic film is set to about 60%. As a result, the hydrophilicity and the photocatalytic property can be sufficiently assured, and the surface reflectivity of the photocatalytic hydrophilic film can be effectively restrained. Therefore, the occurrence of a double image caused by the surface reflection of the photocatalytic hydrophilic film can be effectively restrained or be prevented.

20 Claims, 13 Drawing Sheets

REFLECTING MIRROR

CROSS-REFERENCE TO RELATED APPLICATION

This application claims priority under 35 USC 119 from Japanese Patent Application No. 2003-100273, the disclosure of which is incorporated by reference herein.

BACKGROUND OF THE INVENTION

1. Field of the Invention

The present invention relates to a reflecting mirror which reflects light, and more preferably, relates to a reflecting mirror which is suitable as a door mirror and a fender mirror or the like provided outside of a vehicle.

2. Description of the Related Art

A reflecting mirror being referred to as a so-called door mirror for confirming rearward right and left (may be referred to as an outer view mirror) is provided to a vehicle. In the reflecting mirror, recently, a photocatalytic hydrophilic film consisting of a layer made of silicon dioxide ($SiO_2$) and a layer made of titanium dioxide ($TiO_2$) is formed on a glass substrate (see Japanese Patent Application Laid-Open (JP-A) No. 2000-239047 as one example of the photocatalytic hydrophilic film).

That is, since the reflecting mirror of this type is provided outside the vehicle, the reflecting mirror is exposed to rain in the rain. At that time, the adhesion of water droplet such as rain drop to the surface of the reflecting mirror distorts the reflected image. Therefore, a hydrophilic layer made of silicon dioxide or the like is formed on the surface of the reflecting mirror, and thereby the hydrophilicity of the reflecting mirror is improved. Also, the distortion of the reflected image due to the adhesion of the water droplet is restrained by thinning the water adhering to the surface, or the water droplet is evaporated at an early stage.

On the other hand, in the reflecting mirror of this type, the component or the like (mainly organic substances) of the vehicle emission of other vehicles may adhere to the surface of the reflecting mirror in fine weather, and the surface thereof may be dirty. The dirt on the surface of the reflecting mirror reduces the hydrophilicity of the hydrophilic layer. It is thought that a hydrophilic layer made of silicon dioxide and a photocatalyst layer made of titanium dioxide or the like formed on the side of the glass surface or the opposite side thereof are provided, and organic substances adhering to the hydrophilic layer is decomposed near the surface of the reflecting mirror by the photocatalyst function of titanium dioxide or the like to maintain the hydrophilicity of the surface of the hydrophilic layer.

In the conventional photocatalytic hydrophilic film consisting of the layer of silicon dioxide and the layer of titanium dioxide, the film thickness of the layer of titanium dioxide which has comparatively large refractive index is 150 nm to 300 nm (preferably 500 nm in the structure disclosed in JP-A No. 2000-239047). In contrast, the film thickness of the layer of silicon dioxide which has comparatively small refractive index is 10 nm to 30 nm (0.1 nm to 50 nm in the structure disclosed in JP-A No. 2000-239047), and is thinner than that of the layer of titanium dioxide.

When the photocatalytic hydrophilic film whose the thickness of the layer of titanium dioxide having high refractive index is comparatively thick is formed, comparatively strong surface reflection is generated on the surface of the photocatalytic hydrophilic film by optical interference effect. A problem exists in that the reflected image formed by the surface reflection light on the photocatalytic hydrophilic film and the reflected light on the reflecting mirror is a so-called double image.

Especially, in a recent reflecting mirror for a door mirror, an electrochromic element is formed between a glass substrate and a reflecting film, and the light transmittance of an electrochromic element is reduced. Therefore, the light entering the reflecting film is reduced, and the reflected light is reduced when the light caused by the headlight of the following vehicle is reflected by the reflecting film, thereby improving antidazzle.

A problem is generated in that the double image becomes remarkable by reducing the light transmittance in the reflecting mirror which can reduce the light transmittance if necessary by using the electrochromic element or the like.

SUMMARY OF THE INVENTION

It is an object of the present invention to provide a reflecting mirror which has hydrophilicity and photocatalytic property and in which a double image hardly occurs in consideration of the fact.

The reflecting mirror of a first aspect of the invention comprises: a substrate which is substantially transparent or transmits light having a predetermined wavelength; a reflecting film which is formed on one surface of the substrate in a thickness direction thereof and reflects light entering from the other thickness direction surface side; and a photocatalytic hydrophilic film which is formed on the other thickness direction surface of the substrate, and has hydrophilicity and photocatalytic properties, wherein the photocatalytic hydrophilic film is formed by mixing silicon dioxide and titanium dioxide together, a mass ratio of the titanium dioxide in the photocatalytic hydrophilic film is in a range of 30% to 70%, and the photocatalytic hydrophilic film has a film thickness in a range of 120 nm to 180 nm.

According to the reflecting mirror of the first aspect of the invention, light which transmits in the photocatalytic hydrophilic film and the substrate from the other side (that is, surface side) in the thickness direction of the substrate and reaches the reflecting film can be reflected on the reflecting film, and transmits in the substrate and the hydrophilic film. Therefore, when the reflecting mirror is a mirror for confirming a vehicle rear side such as an inner mirror and a door mirror for a vehicle, a driver can confirm the rear of the vehicle by visualizing the reflected image formed by the reflected light.

On the other hand, the reflecting mirror is applied to a mirror for confirming the vehicle rear side provided outside of the vehicle such as a door mirror of the vehicle, the reflecting mirror is exposed to rain in the rain, and water droplet such as rain drop adheres to the surface side of the substrate. Herein, the photocatalytic hydrophilic film is formed on the surface side of the substrate in the reflecting mirror.

Since the photocatalytic hydrophilic film is mainly made of the silicon dioxide, the surface of the photocatalytic hydrophilic film has high "hydrophilicity (so-called wettability)". The contact angle of the water droplet when the water droplet adheres to the surface of the photocatalytic hydrophilic film becomes small, and the water droplet adhered is transformed from a granular shape to an entire thin film shape. Therefore, the distortion of the reflected image reflected on the reflecting film can be reduced. Since the water droplet adhered spread in thin film shape, the water droplet can be evaporated for a short time.

Since the photocatalytic hydrophilic film also contains titanium dioxide ($TiO_2$), the photocatalytic hydrophilic film has not only hydrophilicity but also photocatalytic property. Therefore, when the photocatalytic hydrophilic film is irradiated with light, organic compound such as oil which adheres to the surface of the photocatalytic hydrophilic film is decomposed by the photocatalytic property. As a result, the surface of the photocatalytic hydrophilic film is kept clean, and the hydrophilicity of the surface of the hydrophilic film can be maintained.

When the photocatalytic hydrophilic film is formed by mixing silicon dioxide ($SiO_2$) and titanium dioxide, few mass component ratio of the titanium dioxide reduces the refractive index of light, and the surface reflection generated by optical interference effect is reduced on the surface of the photocatalytic hydrophilic film. However, titanium dioxide contained in the photocatalytic hydrophilic film is a necessary material for giving the photocatalytic property to the photocatalytic hydrophilic film. If the mass component ratio of the titanium dioxide is simply reduced, the photocatalytic property of the photocatalytic hydrophilic film is reduced.

Since in the reflecting mirror of the invention, the mass ratio of the titanium dioxide is in a range of 30% to 70% in the photocatalytic hydrophilic film, and more preferably in a range of 50% to 60%, the reflecting mirror prevents the photocatalytic property of the photocatalytic hydrophilic film from reducing, and the surface reflection is restrained or prevented.

On the other hand, when the mass ratio of titanium dioxide is high, the film thickness of the photocatalytic hydrophilic film influences the surface reflection. Since the film thickness of the photocatalytic hydrophilic film is set to the range of 120 nm to 180 nm in the reflecting mirror of the invention, the film strength of the photocatalytic hydrophilic film is secured, and the surface reflectivity can be effectively restrained.

Thus, since the surface reflection of the photocatalytic hydrophilic film can be effectively restrained or prevented in the reflecting mirror of the invention, the double image caused by the surface reflectivity can be effectively restrained or prevented.

A reflecting mirror of a second aspect of the invention comprises: a substrate which is substantially transparent or transmits light having a predetermined wavelength; a reflecting film which is formed on one surface of the substrate in a thickness direction thereof and reflects light entering from the other thickness direction surface side; a photocatalytic hydrophilic film which is formed on the other thickness direction surface of the substrate, and has hydrophilicity and photocatalytic properties, a substantially transparent film which is formed between the photocatalytic hydrophilic film and the substrate, and has higher refractive index than that of the photocatalytic hydrophilic film, wherein the photocatalytic hydrophilic film is formed by mixing silicon dioxide and titanium dioxide together, a the mass ratio of the titanium dioxide in the photocatalytic hydrophilic film is in a range of 30% to 70%, and the photocatalytic hydrophilic film has a film thickness in a range of 50 nm to 120 nm.

According to the reflecting mirror of the second aspect of the invention, light which transmits in the photocatalytic hydrophilic film, the transparent film and the substrate from the other side (that is, surface side) in the thickness direction of the substrate and reaches the reflecting film can be reflected on the reflecting film, and transmits in the substrate, the transparent film and the hydrophilic film. Therefore, when the reflecting mirror is a mirror for confirming a vehicle rear side such as an inner mirror and a door mirror of a vehicle, a driver can confirm the rear of the vehicle by visualizing the reflected image formed by the reflected light.

On the other hand, the reflecting mirror is applied to a mirror for confirming the vehicle rear side provided outside of the vehicle such as a door mirror of the vehicle, the reflecting mirror is exposed to rain in the rain, and water droplet such as rain drop adheres to the surface side of the substrate. Herein, in the reflecting mirror, the photocatalytic hydrophilic film is formed on the other side in the thickness direction of the substrate, that is, the surface side of the substrate.

Since the photocatalytic hydrophilic film is mainly made of the silicon dioxide, the surface of the photocatalytic hydrophilic film has high "hydrophilicity (so-called wettability)". The contact angle of the water droplet when the water droplet adheres to the surface of the photocatalytic hydrophilic film becomes small, and the water droplet adhered is transformed from the grainy into a thin film overall. Therefore, the distortion of the reflected image reflected by the reflecting film can be reduced. Since the adhered water droplet spreads in thin film shape, the water droplet can be evaporated for a short time.

Since the photocatalytic hydrophilic film also contains titanium dioxide, the photocatalytic hydrophilic film has not only hydrophilicity but also photocatalytic property. Therefore, when the photocatalytic hydrophilic film is irradiated with light, organic compound such as oil which adheres to the surface of the photocatalytic hydrophilic film is decomposed by the photocatalytic property. As a result, the surface of the photocatalytic hydrophilic film is kept clean, and the hydrophilicity of the surface of the hydrophilic film can be maintained.

As mentioned above, the photocatalytic hydrophilic film contains titanium dioxide for giving the photocatalytic property. Therefore, the refractive index of the photocatalytic hydrophilic film is higher than that of the substrate when a glass is used for the substrate.

In the reflecting mirror of the invention, a transparent film is formed between the substrate and the photocatalytic hydrophilic film. The transparent film is substantially transparent, and has the refractive index higher than that of the substrate and the photocatalytic hydrophilic film. Therefore, the surface reflection of the photocatalytic hydrophilic film is effectively restrained or is prevented by optical interference effect of the transparent film.

The mass ratio of the titanium dioxide is set to the range of 30% to 70% in the photocatalytic hydrophilic film in the reflecting mirror of the invention, and more preferably the range of 50% to 60%. The surface reflection is restrained or prevented without reducing the photocatalytic property of the photocatalytic hydrophilic film by the limitation more than necessary.

When the mass ratio of titanium dioxide is high, the film thickness of the photocatalytic hydrophilic film influences the surface reflection. Since the film thickness of the photocatalytic hydrophilic film is set to the range of 50 nm to 120 nm in the reflecting mirror of the invention, the surface reflectivity can be effectively restrained while the film strength of the photocatalytic hydrophilic film is secured.

Thus, the surface reflection of the photocatalytic hydrophilic film can be effectively restrained or prevented in the reflecting mirror of the invention, whereby the double image caused by the surface reflection can be effectively restrained or prevented.

Examples of materials for the transparent film of the reflecting mirror of the invention include ceramic materials such as tin dioxide ($SnO_2$), indium trioxide ($In_2O_3$), nickel oxide (NiO), zirconium dioxide ($ZrO_2$) and titanium dioxide ($TiO_2$). However the material for the transparent film is not limited to the material listed.

However, it is preferable that the material of the transparent film has high mechanical strength (hardness) and chemical stability so as to secure the film strength. It is needless to say that it is preferable that the material itself is low cost from the view point of the cost. The material which can be formed by a chamical film forming method such as a vacuum deposition method and a sol-gel method is preferable from the view point of the manufacturing cost at the time of forming the film.

A third aspect of the invention is to provide a reflecting mirror according to the second aspect, wherein the transparent film of is mainly made of tin dioxide, and the film thickness of the transparent film is set to the range of 40 nm to 120 nm.

In a reflecting mirror of a third aspect of the invention, tin dioxide ($SnO_2$) is mainly used for the material of the transparent film. Herein, tin dioxide has high hardness and chemical stability. Therefore, the mechanical strength of the transparent film can be sufficiently secured by forming the transparent film using tin dioxide, and deterioration or the like is easily not caused. Since tin dioxide itself is low cost, and the film made of the tin dioxide can be formed by a chemical film forming method such as a vacuum deposition method and a sol-gel method, the cost for manufacturing the film is low, and, consequently, the manufacturing cost of the reflecting mirror is low.

Since the film thickness of the transparent film mainly made of tin dioxide is set to the range of 40 nm to 120 nm in the reflecting mirror of the invention, the surface reflection of the photocatalytic hydrophilic film is effectively restrained or prevented.

A fourth aspect of the invention is to provide a reflecting mirror according to any one of the first to third aspects, wherein a thin film-shaped transmittance changing part in which the light transmittance changes under predetermined conditions is formed between the reflecting film and the substrate in.

In a reflecting mirror of a fourth aspect of the invention, the thin film-shaped transmittance changing part in which the light transmittance changes under predetermined conditions is formed between the reflecting film and the substrate. Therefore, when the reflecting mirror of the invention is applied as a mirror for confirming a vehicle rear side, the light reflected on the reflecting film can be restrained by reducing the light transmittance of the transmittance changing part.

Therefore, when the headlight or the like of a rear vehicle are too bright, the antidazzle can be improved by reducing the light transmittance in the transmittance changing part as described above and by restraining the reflected light.

In the invention, the specific structure of the transmittance changing part is not limited. However examples include a so-called electrochromic element and a liquid crystal element.

DETAILED DESCRIPTION OF THE INVENTION

<First Embodiment>

Figure 1:
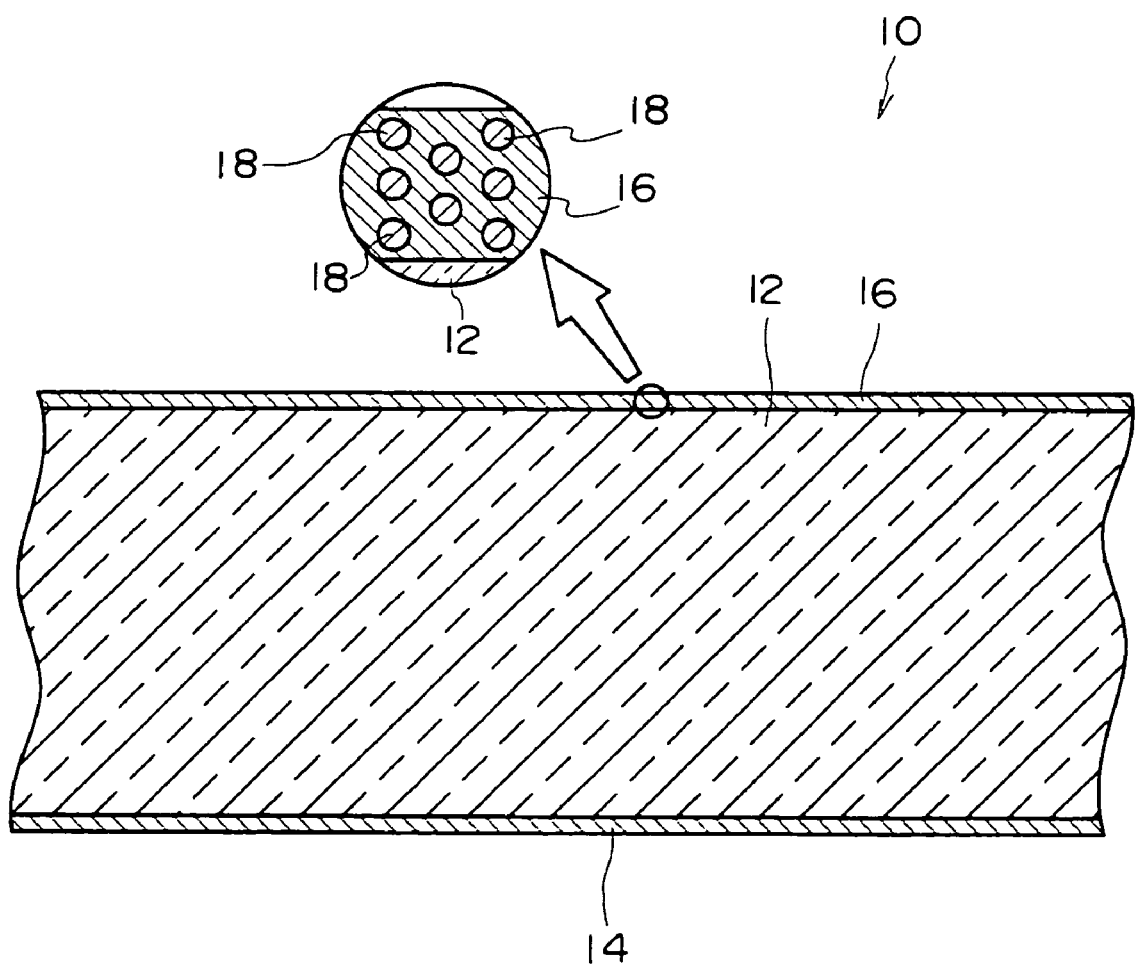
FIG. 1 is a cross-sectional view showing a schematic structure of a reflecting mirror of a first embodiment of the present invention.

FIG. 1 shows a schematic cross-sectional view of a reflecting mirror 10 of the first embodiment of the present invention.

As shown in FIG. 1, the reflecting mirror 10 comprises a glass substrate 12 as a substrate. A reflecting film 14 is formed on the back surface of the glass substrate 12.

For example, the reflecting film 14 is made of chrome or an alloy essentially consisting of the chrome. At least the surface of the side of the glass substrate 12 of the reflecting film 14 formed on the glass substrate 12 has sufficient luster, and high reflectivity. Therefore, when light entering from the surface side of the glass substrate 12 transmits in the glass substrate 12 and reaches the back surface of the glass substrate 12, the light is reflected by the reflecting film 14. The light reflected transmits in the glass substrate 12 again, and moves toward the surface side of the glass substrate 12.

In the embodiment, the reflecting film 14 is made of chrome or an alloy essentially consisting of the chrome. The configuration of the reflecting film 14 is not limited to the one described above. For example, the reflecting film 14 may be made of a so-called silver-white metal such as aluminum and silver, or an alloy essentially consisting of the metals.

On the other hand, a photocatalytic hydrophilic film 16 is formed on the surface of the glass substrate 12 (that is, the surface opposite to the surface side of the glass substrate 12 on which the reflecting film 14 is formed). The photocatalytic hydrophilic film 16 is mainly made of silicon dioxide ($SiO_2$). The thickness thereof may be basically set to the range of 120 nm to 180 nm. In the embodiment, the thickness thereof is set to the range of 145 nm to 165 nm.

Since the photocatalytic hydrophilic film 16 is mainly made of silicon dioxide ($SiO_2$) as described above, the light transmittance of the photocatalytic hydrophilic film 16 is almost equal to that of the glass substrate 12, and thereby the light can be sufficiently transmitted. The photocatalytic hydrophilic film 16 has high wettability of the surface (accurately, the surface opposite to the glass substrate 12) thereof, and the contact angle between the surface and water droplet is 10° or less when the water droplet adheres.

Figure 2:
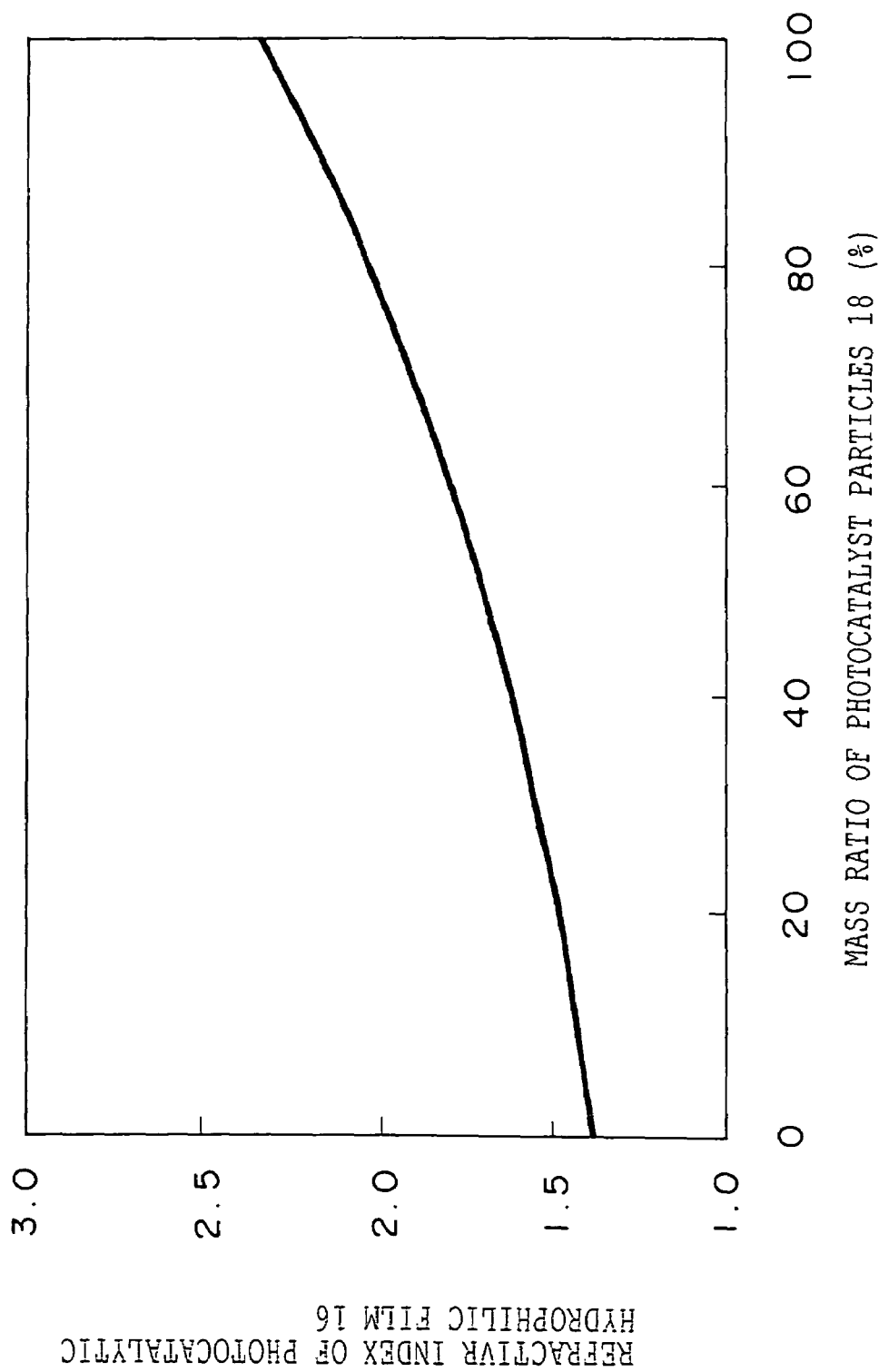
FIG. 2 is a graph showing the relationship between the mass ratio of photocatalyst particles (titanium dioxide) and the refractive index of a photocatalytic hydrophilic film.

As shown in FIG. 2, granular photocatalyst particles 18 mainly made of titanium dioxide ($TiO_2$) are buried in photocatalytic hydrophilic film 16.

The photocatalyst particles 18 have a particle diameter in a range of 30 nm to 80 nm, and are approximately uniformly distributed in the photocatalytic hydrophilic film 16. In other words, the photocatalytic hydrophilic film 16 has a matrix-like internal structure, and the photocatalyst particles 18 are buried in voids formed intermittently in the photocatalytic hydrophilic film 16.

The mass ratio of the photocatalyst particles 18 to the entire photocatalytic hydrophilic film 16 may be basically set to the range of 30% to 70%, and more preferably, may be set to the range of 50% to 60%. In the embodiment, the mass ratio of the photocatalyst particles 18 to the entire photocatalytic hydrophilic film 16 is set to about 60%.

The photocatalyst particles 18 are mainly made of titanium dioxide, and have so-called "photocatalytic property (photocatalytic function)". When the photocatalyst particles 18 are irradiated with light, organic compounds adhering to the surface of the photocatalytic hydrophilic film 16 is decomposed by the photocatalytic function.

For example, the photocatalytic hydrophilic film 16 containing the photocatalyst particles 18 is formed on the glass substrate 12 by "spin coating method".

The spin coating method is a known technique, and the detail description is omitted. First, a solute which contains silicon dioxide as a basic element of the photocatalytic hydrophilic film 16 is dissolved in a solvent. A film stock solution which is mixed with the photocatalyst particles 18 is then applied or is dropped on the surface of the glass substrate 12. The glass substrate 12 on which the film stock solution is applied is rotated around an axis in the thickness direction of the glass substrate 12, and thereby, at the time, the film stock solution is thinly spread on the entire surface of the glass substrate 12 by centrifugal force.

In this state, the glass substrate 12 on which the film stock solution is applied is dried. The photocatalytic hydrophilic film 16 is then formed on the surface of the glass substrate 12 by firing the glass substrate 12 on which the film stock solution is applied in a baking furnace.

Next, the operation and effects of the embodiment will be described.

Even if water droplet such as rain water adheres to the surface of the reflecting mirror 10, that is, on the surface of the photocatalytic hydrophilic film 16, the photocatalytic hydrophilic film 16 formed on the glass substrate 12 as described above causes the contact angle of the water droplet of less than 10°. Therefore, the water droplet does not remain in so-called granulates, and spreads as a thin film. As a result, the distortion of the reflected image is restrained.

On the other hand, for example, when the reflecting mirror 10 is applied as a mirror body such as a fender mirror and a door mirror provided outside of a vehicle, organic substances contained in the vehicle emission of other vehicles adhere to the surface of the reflecting mirror 10, and thereby the hydrophilicity of the photocatalytic hydrophilic film 16 is reduced. However, as described above, the photocatalyst particles 18 mainly composed of titanium dioxide are mixed in the photocatalytic hydrophilic film 16. The effect of the photocatalyst caused by the radiation of the light to the photocatalyst particles 18 decomposes the organic substances adhering to the surface of the reflecting mirror 10, and thereby the surface of the reflecting mirror 10 is purified. As a result, the hydrophilicity of the photocatalytic hydrophilic film 16 is not impaired.

The photocatalytic hydrophilic film 16 is formed by the spin coating method in the embodiment, and the mass ratio of the photocatalyst particles 18 made of the titanium dioxide is set to about 60% in the photocatalytic hydrophilic film 16.

FIG. 2 is a graph showing the relationship between the mass ratio of the photocatalyst particles 18 and the refractive index of the photocatalytic hydrophilic film 16 when the wavelength of light is 555 nm. As is observed from the graph, basically speaking, the smaller the mass ratio of the photocatalyst particles 18 in the photocatalytic hydrophilic film 16 (that is, the mass ratio of titanium dioxide) is, the lower the refractive index of the photocatalytic hydrophilic film 16 is. As described above, since the mass ratio of the photocatalyst particles 18 is about 60% in the photocatalytic hydrophilic film 16 in the reflecting mirror 10, the refractive index is about 1.8.

Figure 3:
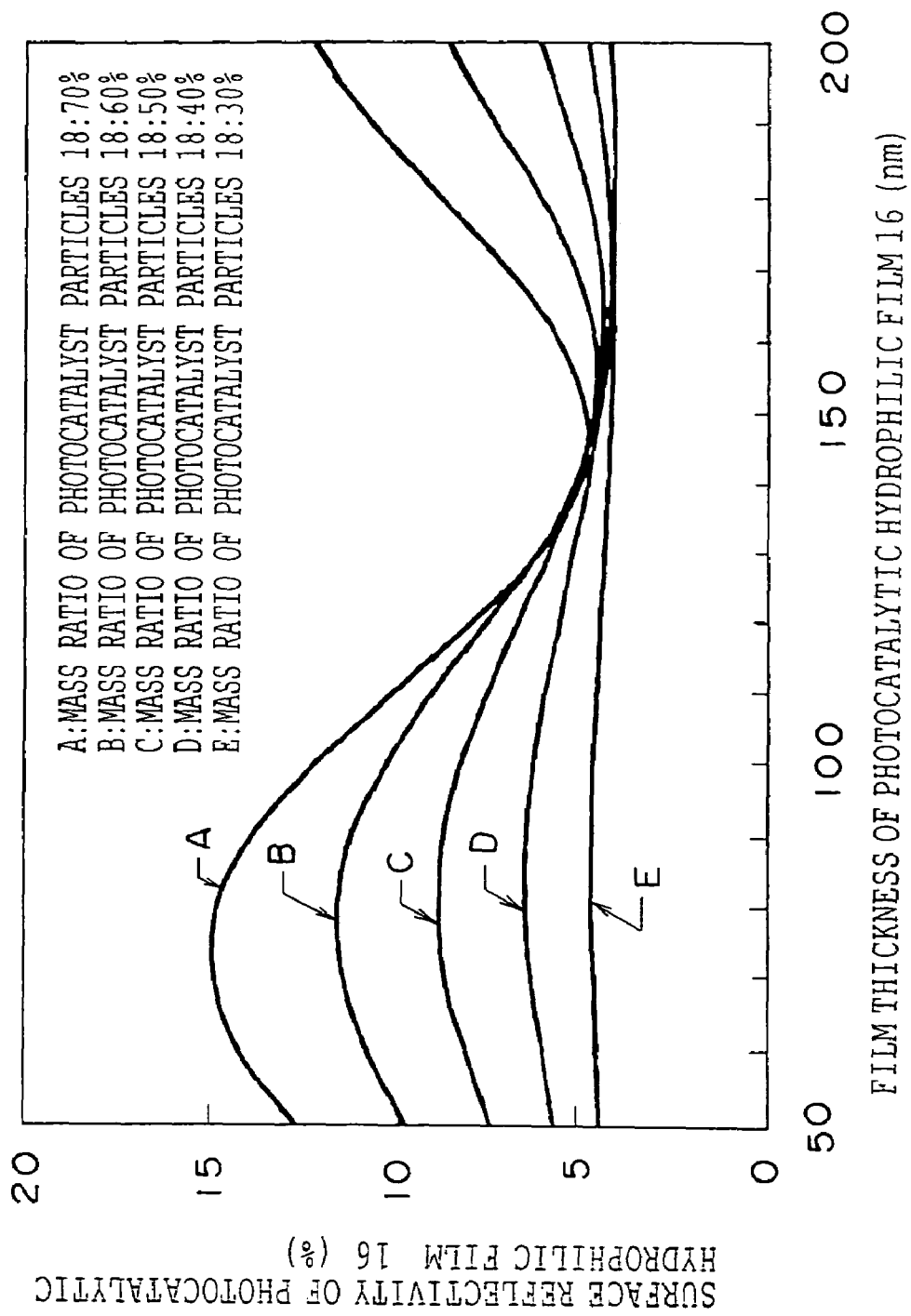
FIG. 3 is a graph showing the relationship between the film thickness of the photocatalytic hydrophilic film and the surface reflectivity of the photocatalytic hydrophilic film.

On the other hand, FIG. 3 is a graph showing the relationship between file thickness of the photocatalytic film 16 and the refractive index of the photocatalytic hydrophilic film 16 when the wavelength of light is 555 nm at every weight ratio of the photocatalyst particles 18. As is observed from the graph, the surface reflectivity of the photocatalytic hydrophilic film 16 is lowest in a range of about 140 nm to about 160 nm of the film thickness of the photocatalytic hydrophilic film 16. The lower the mass ratio of the photocatalyst particles 18 is, the lower the dependence of the surface reflectivity of the photocatalytic hydrophilic film 16 to the film thickness thereof is.

Therefore, basically speaking, if the mass ratio of the photocatalyst particles 18 is low, the refractive index and surface reflectivity of the photocatalytic hydrophilic film 16 can be reduced. However, the reduction of the mass ratio of the photocatalyst particles 18 reduces the photocatalytic property.

Since the mass ratio of the photocatalyst particles 18 is about 60% in the embodiment as described above, the photocatalytic property can be sufficiently secured. In addition, since the film thickness of the photocatalytic hydrophilic film 16 is set to the range of 145 nm to 165 nm in the embodiment, the surface reflectivity of the photocatalytic hydrophilic film 16 can be set to about 5%, and the difference between the surface reflectivity of the photocatalytic hydrophilic film 16 and surface reflectivity (4.2%) of the glass substrate 12 can be reduced.

Since the reflecting mirror 10 of the embodiment can effectively restrain the surface reflectivity of photocatalytic hydrophilic film 16 without impairing the hydrophilicity and the photocatalytic property, the double image caused by the surface reflection of the photocatalytic hydrophilic film 16 can be effectively restrained or be prevented.

In addition, since the film thickness of the photocatalytic hydrophilic film 16 is in a range of 145 nm to 165 nm and is not extremely thin, the mechanical strength of the photocatalytic hydrophilic film 16 can be sufficiently secured.

<Second Embodiment>

Next, another embodiment of the invention will be described. The same reference numerals as the components of the first embodiment are basically assigned to identical components for describing the following embodiments, and their explanation is omitted.

Figure 4:
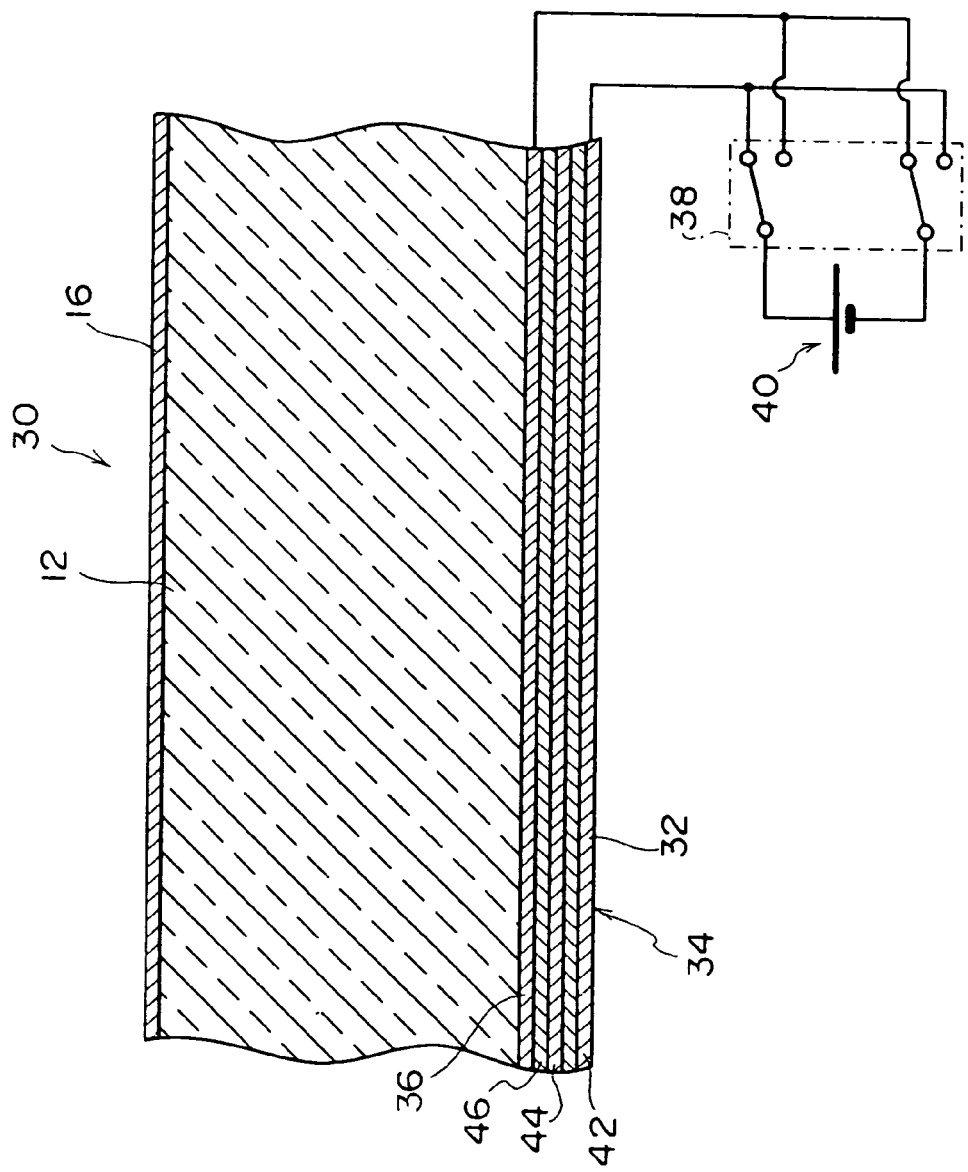
FIG. 4 is a cross-sectional view showing a schematic structure of a reflecting mirror of a second embodiment of the invention.

FIG. 4 is a cross-sectional view showing a schematic structure of a reflecting mirror 30 of the second embodiment of the invention.

As shown in FIG. 4, the reflecting mirror 30 comprises a conductive reflecting film 32 as a reflecting film in place of the reflecting film 14. The conductive reflecting film 32 is made of aluminum or an alloy essentially consisting of the aluminum. The surface of the side of the glass substrate 12 of the conductive reflecting film 32 has sufficient luster and high light reflectivity as well as the reflecting film 14 of the first embodiment.

An electrochromic film 34 which is a whole solid thin film as a transmittance changing part is formed on the back surface of the glass substrate 12 of the reflecting mirror 30 (the opposite side to the photocatalytic hydrophilic film 16).

The electrochromic film 34 comprises a transparent electrode film 36. The transparent electrode film 36 is made of an oxide of an alloy of indium and tin, so-called "ITO". Also, the transparent electrode film 36 is basically substantially transparent, and has electroconductivity. A pair of electrodes of the electrochromic film 34 are composed of the transparent electrode film 36 and the conductive reflecting film 32 (that is, the conductive reflecting film 32 not only composes the reflecting film, but also is a part of the constitution of the electrochromic film 34).

The transparent electrode film 36 and the conductive reflecting film 32 are connected to a power supply 40 through a switch 38, and voltage can be applied from the side of the transparent electrode film 36 or the side of the conductive reflecting film 32 by operating the switch 38 appropriately.

In the embodiment, the voltage is applied from the side of the transparent electrode film 36 or the side of the conductive reflecting film 32 by operating the switch 38 merely. For example, the switch 38 may be connected to a control circuit or a controller (in the general meaning, "control part") containing CPU (ECU). Further, a light sensor which outputs high-level signals may be connected to the control circuit or the controller when light of more than specified brightness is received, and the switch 38 may be operated by the control circuit or the controller based on the signals from the light sensor.

On the other hand, a reduction coloring film 42 is formed between the transparent electrode film 36 and the conductive reflecting film 32. The reduction coloring film 42 is made of tungsten trioxide ($WO_3$) in the embodiment. The reduction coloring film 42 is basically substantially transparent. The reduction coloring film 42 causes an electrochemical reaction reversible to hydrogen ion (H+), and is colored to a blue color by the bonding of the hydrogen ion. When the bonding of the hydrogen ion is released in the coloring state, the coloring is released, and the reduction coloring film 42 returns to a substantially transparent color again.

An ion conductive film 44 is formed between the reduction coloring film 42 and the transparent electrode film 36. In the embodiment, the ion conductive film 44 is made of tantalum pentoxide ($Ta_3O_5$) and contains moisture.

An oxidation coloring film 46 is formed between the ion conductive film 44 and the transparent electrode film 36. The oxidation coloring film 46 is made of iridium dioxide ($IrO_2$) in the embodiment. The reduction coloring film 42 causes an electrochemical reaction reversible to hydroxyl group (OH−) and, and thereby the reduction coloring film 42 is colored or, the coloring of the reduction coloring film 42 is released.

In the reflecting mirror 30 on which the electrochromic film 34 is formed, the moisture contained in the ion conductive film 44 is electroanalyzed, and hydrogen ions and hydroxyl groups are generated when the voltage is applied from the side of the transparent electrode film 36 to the side of the conductive reflecting film 32 by operating the switch 38.

When the hydrogen ions generated as described above move to the side of the reduction coloring film 42 and reach the reduction coloring film 42, tungsten trioxide composing the reduction coloring film 42 causes the chemical reaction. The reduction coloring film 42 is colored to a generally blue color by the chemical reaction.

On the other hand, the hydroxyl groups generated by electroanalyzing the moisture contained in the ion conductive film 44 move to the side of the oxidation coloring film 46. When the hydroxyl groups reach to the oxidation coloring film 46, iridium dioxide composing the oxidation coloring film 46 causes the chemical reaction. The oxidation coloring film 46 is colored by the chemical reaction.

As described above, the reduction coloring film 42 and the oxidation coloring film 46 are colored, and thereby the light transmittance of the electrochromic film 34 is reduced. Therefore, for example, when the light of the headlight of the following vehicle is strong and the reflected light of the reflecting mirror 30 is dazzled, the transmittance of the light of the electrochromic film 34 is reduced by coloring the reduction coloring film 42 and the oxidation coloring film 46 as described above. Thereby so-called antidazzle is improved.

On the other hand, when a reverse voltage, that is, a predetermined voltage is applied from the side of the conductive reflection film 32 to the side of the transparent electrode film 36 by operating the switch 38 with the reduction coloring film 42 and the oxidation coloring film 46 colored, the chemical reaction opposite to the case that the reduction coloring film 42 and the oxidation coloring film 46 are colored is caused, and the coloring of the reduction coloring film 42 and the oxidation coloring film 46 are released.

As described above, since the light transmittance of the electrochromic film 34 is reduced in the state that the reduction coloring film 42 and the oxidation coloring film 46 are colored, the light quantity of reflected light is reduced. However, even if the transmittance of the light of the electrochromic film 34 varies, the surface reflection light of the photocatalytic hydrophilic film 16 is not influenced. Therefore, even if the electrochromic film 34 is used, the reflectivity of the photocatalytic hydrophilic film 16 is high, and the light quantity of reflected light is not reduced sufficiently. Thereby the effect is not achieved sufficiently.

However, since the photocatalytic hydrophilic film 16 of the reflecting mirror 30 has the same constitution as that of the photocatalytic hydrophilic film 16 of the reflecting mirror 10 of the first embodiment, the surface reflectivity of the photocatalytic hydrophilic film 16 can be sufficiently reduced. Therefore, the antidazzle due to electrochromic film 34 can be sufficiently exhibited.

<Third Embodiment>

Next, a third embodiment of the invention will be described.

Figure 5:
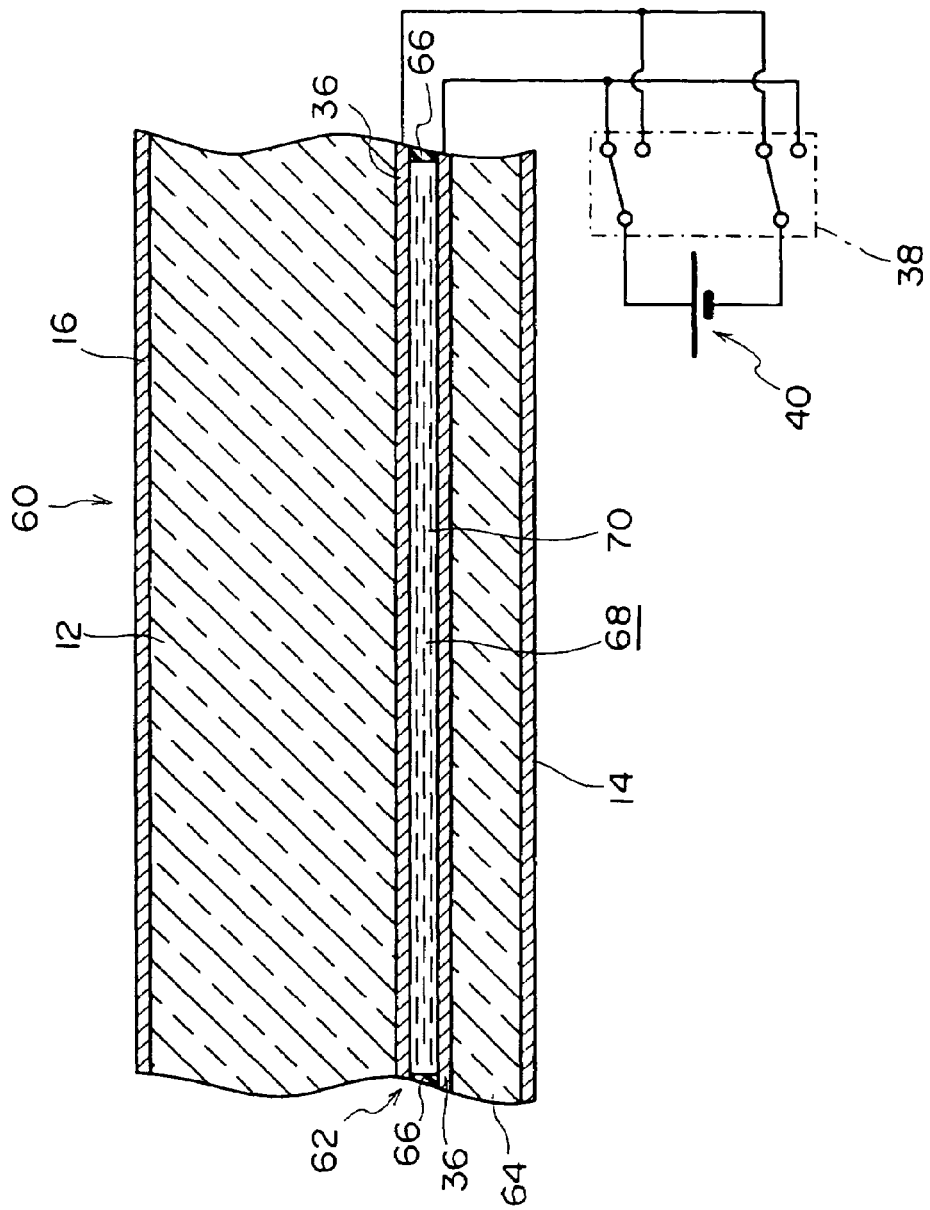
FIG. 5 is a cross-sectional view showing a schematic structure of a reflecting mirror of a third embodiment of the invention.

FIG. 5 shows a schematic cross-sectional view of a reflecting mirror 60 of the third embodiment of the invention.

As shown in FIG. 5, in the reflecting mirror 60, an electrochromic layer 62 as a transmittance changing part is formed between the reflecting film 14 and the glass substrate 12.

The electrochromic layer 62 comprises a transparent glass substrate 64. A pair of transparent electrode films 36 are formed on the surface of the glass substrate 64 so as to oppose each other in the thickness direction of the glass substrate 64 (the surface of the side of the glass substrate 12).

The transparent electrode films 36 are connected to the power supply 40 through the switch 38, and voltage can be applied from the side of one transparent electrode film 36 or the side of the other transparent electrode film 36 by operating the switch 38 appropriately.

For example, a seal 66 is formed between one transparent electrode film 36 and the other transparent electrode film 36 near the peripheral part of the transparent electrode films 36. A cell 68 is formed by the transparent electrode films 36 and the seal 66, and liquid or gel electrochromic material 70 is enclosed in the cell 68.

A conductive polymer material is applied as one example of the electrochromic material 70.

The electrochromic material 70 is colored by applying voltage from one side of the pair of transparent electrode films 36, and the coloring thereof is released by applying voltage from the other side.

The structure of the electrochromic layer 62 of the reflecting mirror 60 is different from that of the electrochromic film 34 of the reflecting mirror 30 of the second embodiment. For example, the electrochromic material 70 is colored to a blue color when voltage is applied from the side of one transparent electrode film 36, and thereby the light transmittance of the electrochromic layer 62 is reduced.

Therefore, the electrochromic layer 62 can also obtain the same effect as the electrochromic film 34 of the reflecting mirror 30 of the second embodiment.

Since the photocatalytic hydrophilic film 16 of the reflecting mirror 60 has also the same constitution as the photocatalytic hydrophilic film 16 of the reflecting mirrors 10, 30 of the first and second embodiment, the surface reflectivity of the photocatalytic hydrophilic film 16 can be sufficiently reduced similarly to the second embodiment. Therefore, the antidazzle due to electrochromic film 62 can be sufficiently exhibited.

<Fourth Embodiment>

Next, a fourth embodiment of the invention will be described.

Figure 6:
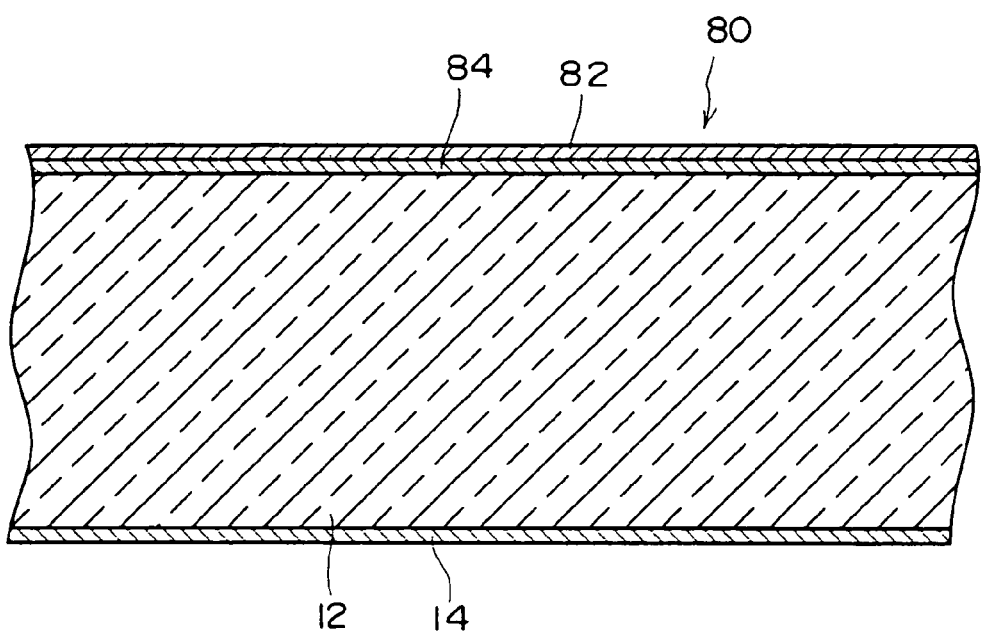
FIG. 6 is a cross-sectional view showing a schematic structure of a reflecting mirror of a fourth embodiment of the invention.

FIG. 6 shows a schematic cross-sectional view of a reflecting mirror 80 of a fourth embodiment of the invention.

As shown in FIG. 6, the reflecting mirror 80 comprises a photocatalytic hydrophilic film 82 in place of the photocatalytic hydrophilic film 16. The material and the structure or the like of the photocatalytic hydrophilic film 82 are basically the same as those of the photocatalytic hydrophilic film 16. However, the film thickness of the photocatalytic hydrophilic film 82 is basically set to the range of 50 nm to 100 nm. The photocatalytic hydrophilic film 82 having the film thickness set to about 80 nm in the embodiment is especially different from that of the photocatalytic hydrophilic film 16.

A transparent film 84 is formed between the glass substrate 12 and the photocatalytic hydrophilic film 82 in the reflecting mirror 80. The transparent film 84 is made of tin dioxide ($SnO_2$). The transparent film 84 is substantially transparent, and can sufficiently transmit light. The thickness of the transparent film 84 is basically set to the range of 40 nm to 120 nm, and especially, the thickness is set to about 90 nm in the embodiment.

Since the transparent film 84 is made of tin dioxide, the refractive index thereof is about 1.9 when the wavelength of light is 555 nm, and is higher than that of the photocatalytic hydrophilic film 82 or the glass substrate 12.

Thus, in the reflecting mirror 80, the film thickness of photocatalytic hydrophilic film 82 is thinner than that of the photocatalytic hydrophilic film 16. However, a transparent film 84 which has higher refractive index of light than the photocatalytic hydrophilic film 82 and the glass substrate 12, is interposed between the photocatalytic hydrophilic film 82 and the glass substrate 12 in the reflecting mirror 80.

Figure 7:
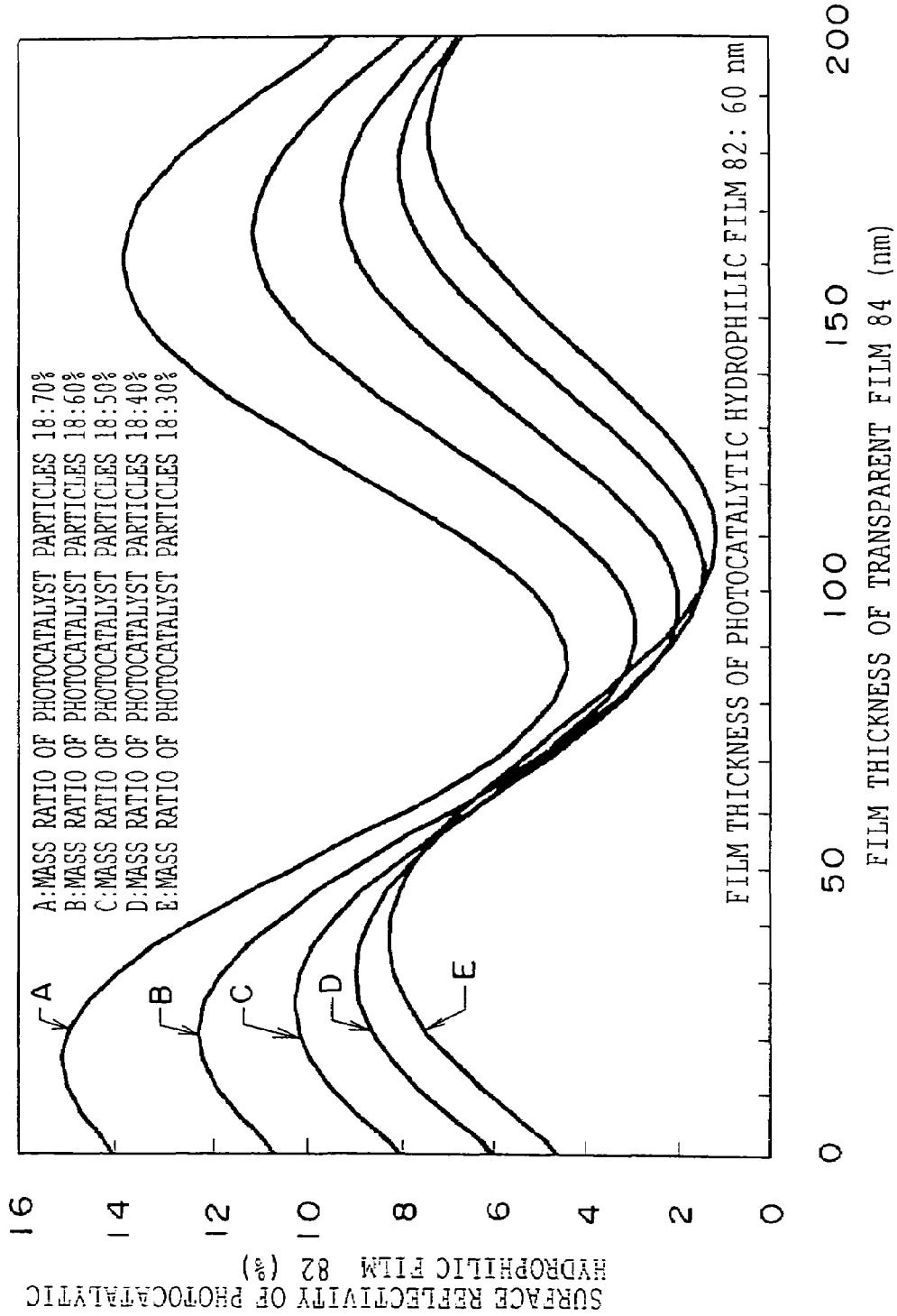
FIG. 7 is a graph showing the relationship between the film thickness of a transparent film and the surface reflectivity of the photocatalytic hydrophilic film when the photocatalytic hydrophilic film has the film thickness of 60 nm.
Figure 8:
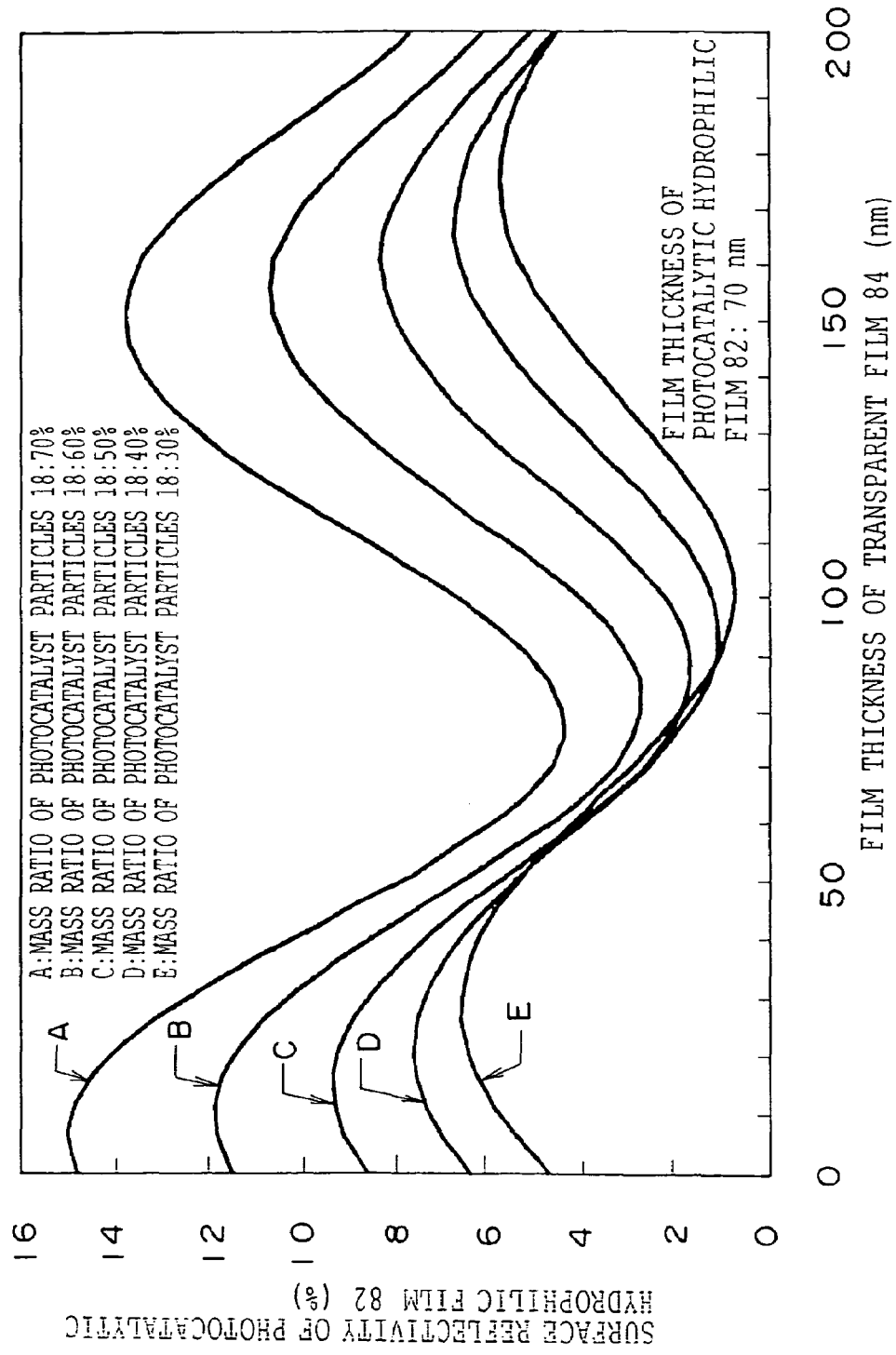
FIG. 8 is a graph showing the relationship between the film thickness of a transparent film and the surface reflectivity of the photocatalytic hydrophilic film when the photocatalytic hydrophilic film has the film thickness of 70 nm.
Figure 9:
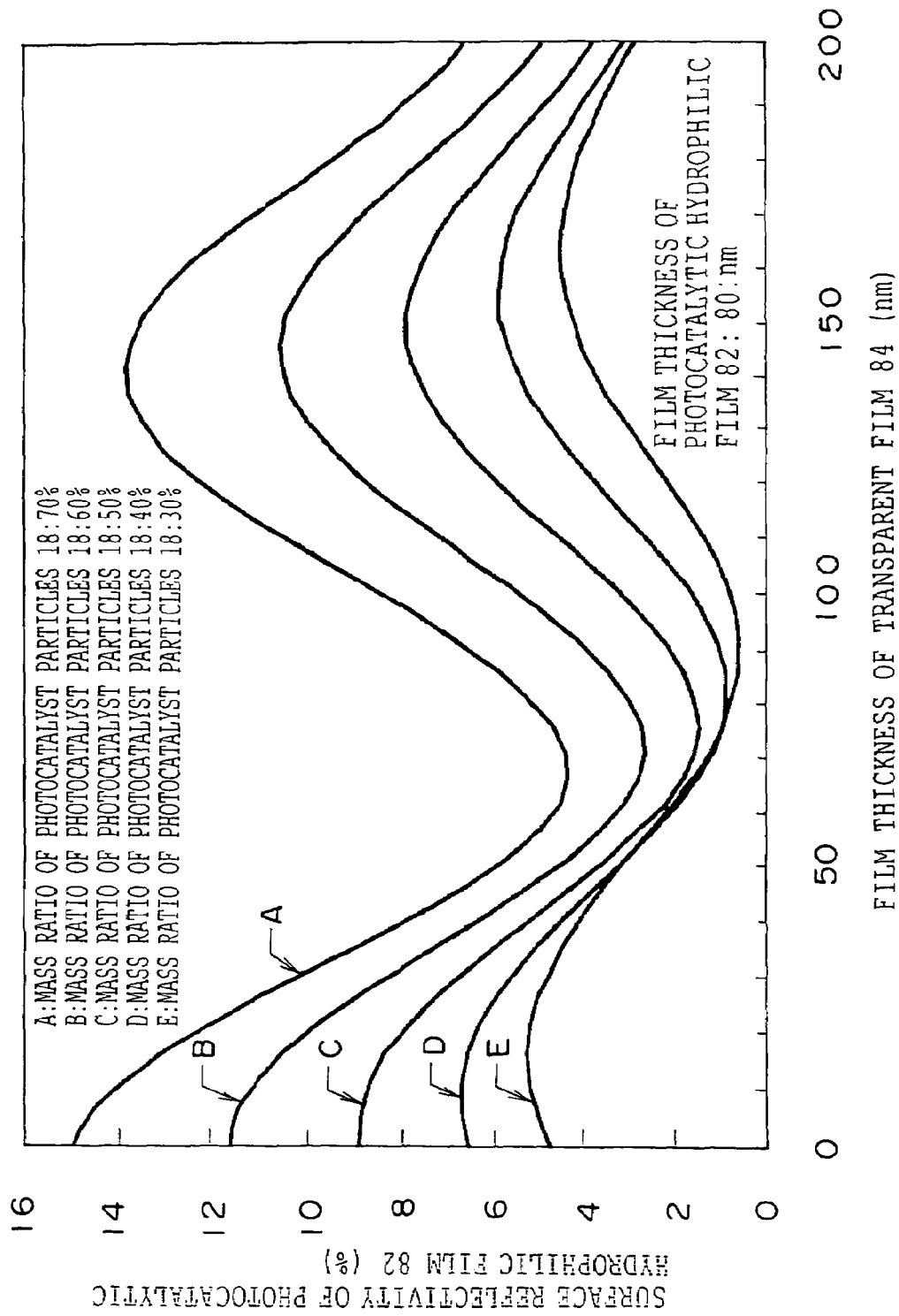
FIG. 9 is a graph showing the relationship between the film thickness of a transparent film and the surface reflectivity of the photocatalytic hydrophilic film when the photocatalytic hydrophilic film has the film thickness of 80 nm.
Figure 10:
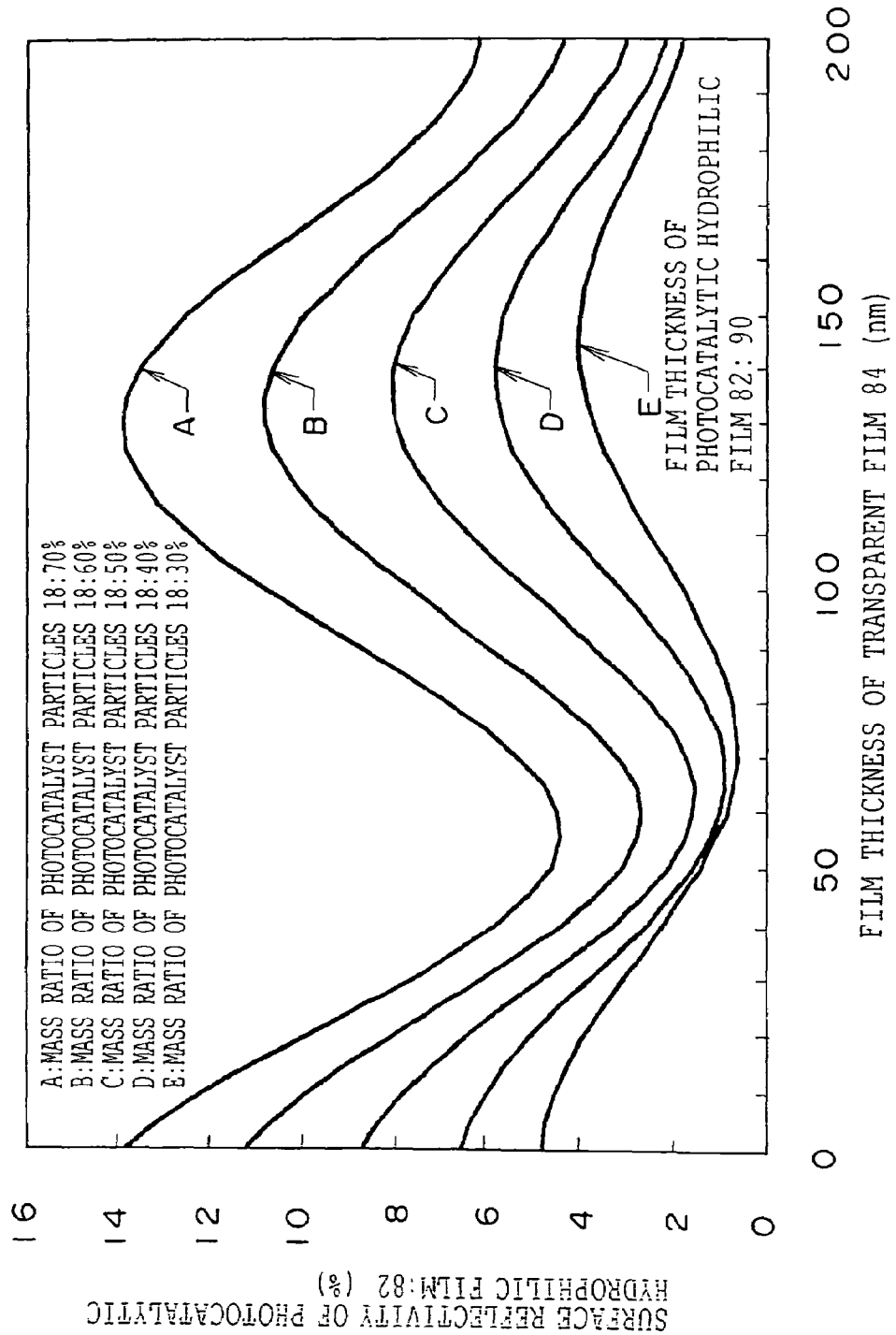
FIG. 10 is a graph showing the relationship between the film thickness of a transparent film and the surface reflectivity of the photocatalytic hydrophilic film when the photocatalytic hydrophilic film has the film thickness of 90 nm.
Figure 11:
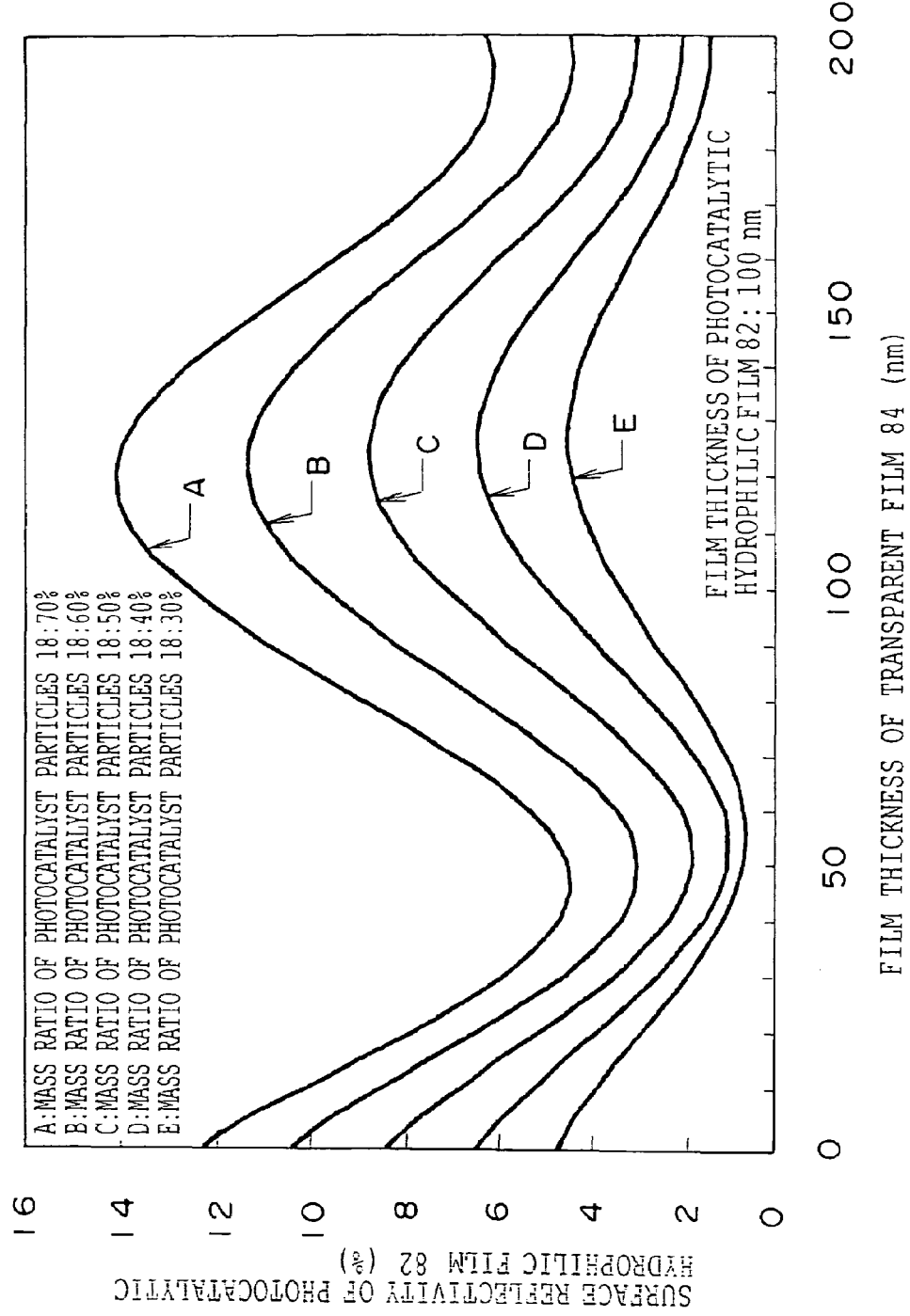
FIG. 11 is a graph showing the relationship between the film thickness of a transparent film and the surface reflectivity of the photocatalytic hydrophilic film when the photocatalytic hydrophilic film has the film thickness of 100 nm.

Herein, FIG. 9 is a graph showing the relationship between the film thickness of a transparent film 84 and the surface reflectivity of the photocatalytic hydrophilic film 82 when the photocatalytic hydrophilic film has the film thickness of 80 nm. FIG. 7 is a graph showing the relationship between the film thickness of a transparent film and the surface reflectivity of the photocatalytic hydrophilic film 82 when the photocatalytic hydrophilic film has the film thickness of 60 nm. FIG. 8 is a graph showing the relationship between the film thickness of a transparent film and the surface reflectivity of the photocatalytic hydrophilic film 82 when the photocatalytic hydrophilic film has the film thickness of 70 nm. FIG. 10 is a graph showing the relationship between the film thickness of a transparent film and the surface reflectivity of the photocatalytic hydrophilic film when the photocatalytic hydrophilic film 82 has the film thickness of 90 nm. FIG. 11 is a graph showing the relationship between the film thickness of a transparent film and the surface reflectivity of the photocatalytic hydrophilic film when the photocatalytic hydrophilic film 82 has the film thickness of 100 nm.

Among the figures, especially, as shown in FIG. 9 as a graph when the photocatalytic hydrophilic film 82 has the film thickness of 80 nm, difference exists by the mass ratio of the photocatalyst particles 18 made of titanium dioxide. The surface reflectivity of the photocatalytic hydrophilic film 82 reaches a low value when the film thickness of the transparent film 84 is in a range of about 40 nm to about 120 nm. When especially, the mass ratio of the photocatalyst particles 18 is set to about 60% as the embodiment, and the film thickness of the transparent film 84 is set to about 90 nm, the surface reflectivity of the photocatalytic hydrophilic film 82 is about 4.1%. Also, the surface reflectivity of the photocatalytic hydrophilic film 82 is almost equal to that of a glass whose the refractive index is about 4.1%.

In the reflecting mirror 80, since the structure of the photocatalytic hydrophilic film 82 has the same structure as the photocatalytic hydrophilic films 16 of the reflecting mirrors 10, 30, 60 of the embodiments 1 to 3, and the mass ratio of photocatalyst particle 18 is set to about 60%, the photocatalytic property can be sufficiently secured.

Since the reflecting mirror 80 of the embodiment can effectively restrain the surface reflectivity of the photocatalytic hydrophilic film 82 without impairing the hydrophilicity and the photocatalytic property, the double image caused by the surface reflectivity of the photocatalytic hydrophilic film 82 can be effectively restrained or be prevented.

In addition, the film thickness of the photocatalytic hydrophilic film 82 is thin. However the transparent film 84 is formed, and thereby the mechanical strength of the photocatalytic hydrophilic film 82 can be sufficiently assured as a result.

In the embodiment, the transparent film 84 is made of tin dioxide. However, the refractive index of light of the transparent film 84 may be higher than that of the photocatalytic hydrophilic film 82 and the glass substrate 12, the material of the transparent film 84 is not limited to tin dioxide.

Therefore, ceramic materials such as indium trioxide ($In_2O_3$), nickel oxide (NiO), zirconium dioxide ($ZrO_2$) and titanium dioxide ($TiO_2$) may be used in addition to tin dioxide.

Since the transparent film 84 made of tin dioxide has high mechanical strength (hardness) and is chemically steady as compared to the materials, the transparent film 84 has an advantage that strength of the film is high. Further, since the film can be formed by a chamical film forming method such as a vacuum deposition method and a sol-gel method, the transparent film 84 has an advantage that the manufacturing cost can be reduced.

<Fifth Embodiment>

Next, a fifth embodiment of the invention will be described.

Figure 12:
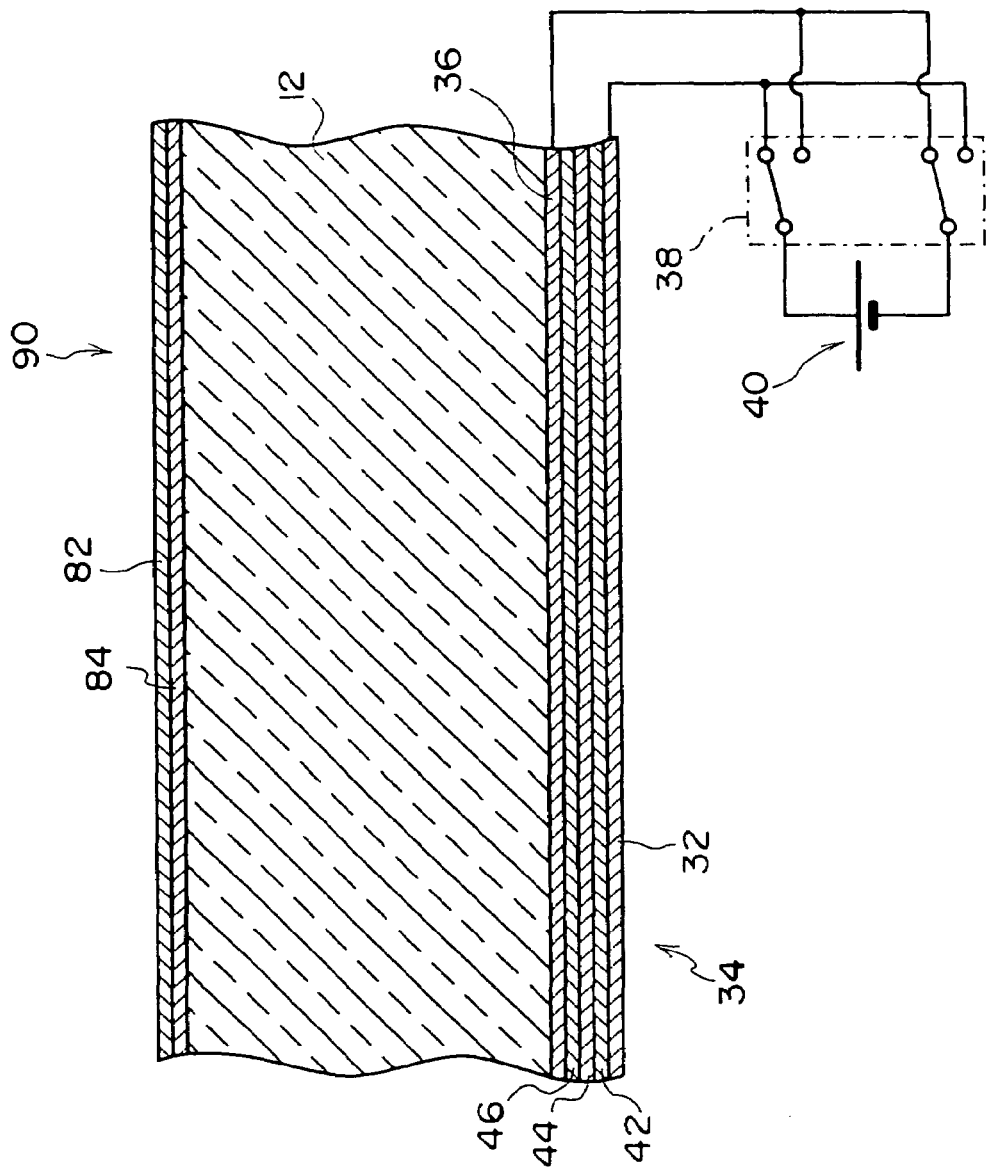
FIG. 12 is a cross-sectional view showing a schematic structure of a reflecting mirror of a fifth embodiment of the invention.

FIG. 12 shows a schematic cross-sectional view of a reflecting mirror 90 a fifth embodiment of the invention.

As shown in FIG. 12, the reflecting mirror 90 is constituted by forming a photocatalytic hydrophilic film 82 and a transparent film 84 in place of the photocatalytic hydrophilic film 16 in the reflecting mirror 30 of the second embodiment.

In the reflecting mirror 90, the operation and effects by forming the photocatalytic hydrophilic film 82 and the transparent film 84 can be obtained in place of the operation and effects obtained by forming the photocatalytic hydrophilic film 16 among the operation and effects of the second embodiment.

That is, as described in the fourth embodiment, the surface reflectivity of the photocatalytic hydrophilic film 82 can be set almost equal to that of the glass of about 4.1% by forming the photocatalytic hydrophilic film 82 and the transparent film 84. Thus, since the surface reflectivity of the photocatalytic hydrophilic film 82 can be sufficiently reduced, the antidazzle due to an electrochromic film 34 can be sufficiently exhibited.

<Sixth Embodiment>

Next, a sixth embodiment of the invention will be described.

Figure 13:
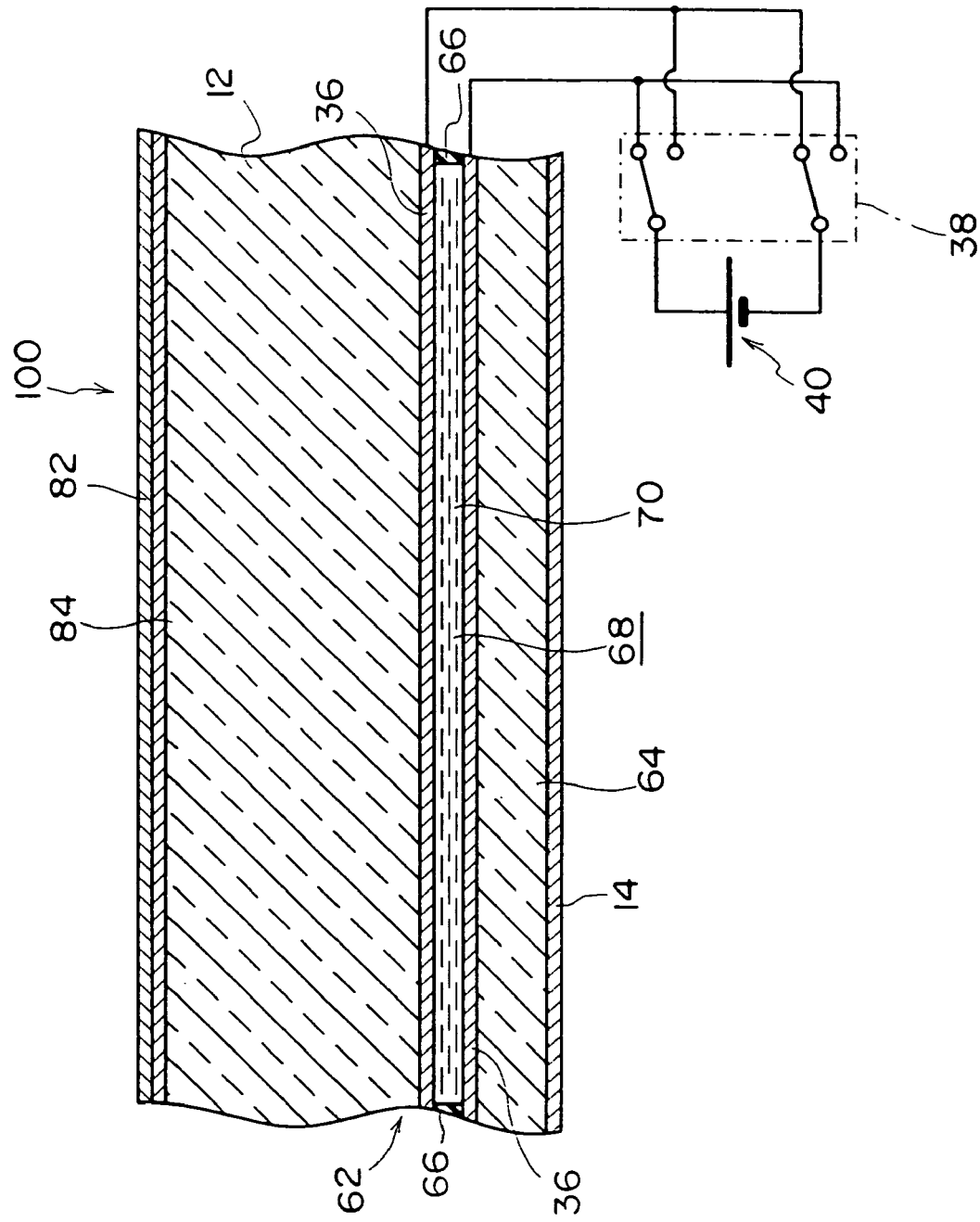
FIG. 13 is a cross-sectional view showing a schematic structure of a reflecting mirror of a sixth embodiment of the invention.

FIG. 13 shows a schematic cross-sectional view of a reflecting mirror 100 of a sixth embodiment of the invention.

As shown in FIG. 13, the reflecting mirror 100 is constituted by forming the photocatalytic hydrophilic film 82 and the transparent film 84 in place of the photocatalytic hydrophilic film 16 in the reflecting mirror 60 of the third embodiment.

In the reflecting mirror 100, the operation and effects by forming the photocatalytic hydrophilic film 82 and the transparent film 84 can be obtained in place of the operation and effects obtained by forming the photocatalytic hydrophilic film 16 among the operation and effects of the third embodiment.

That is, as described in the fourth embodiment, the surface reflectivity of the photocatalytic hydrophilic film 82 can be set almost equal to that of the glass of about 4.1% by forming the photocatalytic hydrophilic film 82 and the transparent film 84. Thus, since the surface reflectivity of the photocatalytic hydrophilic film 82 can be sufficiently reduced, the antidazzle due to the electrochromic film 34 can be sufficiently exhibited.

As described above, the reflecting mirror of the invention has the hydrophilicity and the photocatalytic property due to the photocatalytic hydrophilic film and can prevent or reduce the occurrence of a double image.

What is claimed is:

1. A reflecting mirror comprising:
   a substrate which is substantially transparent or transmits light having a predetermined wavelength;
   a reflecting film which is formed on one surface of the substrate in a thickness direction thereof and reflects light entering from the other thickness direction surface side; and
   a photocatalytic hydrophilic film which is formed on the other thickness direction surface of the substrate, and has hydrophilicity and photocatalytic properties,
   wherein the photocatalytic hydrophilic film is formed by mixing silicon dioxide and titanium dioxide together, a mass ratio of the titanium dioxide in the photocatalytic hydrophilic film is in a range of 30% to 70%, and the photocatalytic hydrophilic film has a film thickness in a range of 120 nm to 180 nm.

2. A reflecting mirror comprising:
   a substrate which is substantially transparent or transmits light having a predetermined wavelength;
   a reflecting film which is formed on one surface of the substrate in a thickness direction thereof and reflects light entering from the other thickness direction surface side;
   a photocatalytic hydrophilic film which is formed on the other thickness direction surface of the substrate, and has hydrophilicity and photocatalytic properties,
   a substantially transparent film which is formed between the photocatalytic hydrophilic film and the substrate, and has higher refractive index than that of the photocatalytic hydrophilic film,
   wherein the photocatalytic hydrophilic film is formed by mixing silicon dioxide and titanium dioxide together, a the mass ratio of the titanium dioxide in the photocatalytic hydrophilic film is in a range of 30% to 70%, and the photocatalytic hydrophilic film has a film thickness in a range of 50 nm to 120 nm.

3. A reflecting mirror according to claim 2, wherein the transparent film is mainly made of tin dioxide and has a film thickness in a range of 40 nm to 120 nm.

4. A reflecting mirror according to claim 1, further comprising, a thin film-shaped transmittance changing part which is disposed between the reflecting film and the substrate, and in which light transmittance changes under predetermined conditions.

5. A reflecting mirror according to claim 2, further comprising, a thin film-shaped transmittance changing part which is formed between the reflecting film and the substrate, and in which light transmittance changes under predetermined conditions.

6. A reflecting mirror according to claim 3, further comprising, a thin film-shaped transmittance changing part which is formed between the reflecting film and the substrate, and in which light transmittance changes under predetermined conditions.

7. A reflecting mirror according to claim 1, wherein the substrate is a glass substrate.

8. A reflecting mirror according to claim 2, wherein the substrate is a glass substrate.

9. A reflecting mirror according to claim 1, wherein the mass ratio of titanium dioxide in the photocatalytic hydrophilic film is in a range of 50% to 60%.

10. A reflecting mirror according to claim 2, wherein the mass ratio of titanium dioxide in the photocatalytic hydrophilic film is in a range of 50% to 60%.

11. A reflecting mirror according to claim 4, wherein the transmittance changing part includes an electrochromic element.

12. A reflecting mirror according to claim 5, wherein the transmittance changing part includes an electrochromic element.

13. A reflecting mirror according to claim 4, wherein the transmittance changing part includes a liquid crystal element.

14. A reflecting mirror according to claim 5, wherein the transmittance changing part includes a liquid crystal element.

15. A reflecting mirror according to claim 1, wherein the photocatalytic hydrophilic film contains granular photocatalyst particles which are buried in the photocatalytic hydrophilic film and are mainly made of titanium dioxide.

16. A reflecting mirror according to claim 2, wherein the photocatalytic hydrophilic film contains granular photocatalyst particles which are buried in the photocatalytic hydrophilic film and are mainly made of titanium dioxide.

17. A reflecting mirror according to claim 15, wherein the photocatalyst particles have a particle diameter in a range of 30 nm to 80 nm, and are substantially uniformly distributed in the photocatalytic hydrophilic film.

18. A reflecting mirror according to claim 16, wherein the photocatalyst particles have a particle diameter in a range of 30 nm to 80 nm, and are substantially uniformly distributed in the photocatalytic hydrophilic film.

19. A reflecting mirror according to claim 15, wherein the photocatalytic hydrophilic film has a matrix-like internal structure, and the photocatalyst particles are buried in voids formed intermittently therein.

20. A reflecting mirror according to claim 16, wherein the photocatalytic hydrophilic film has a matrix-like internal structure, and the photocatalyst particles are buried in voids formed intermittently therein.

* * * * *